United States Patent [19]

Arms

[11] 4,257,183
[45] Mar. 24, 1981

[54] FISHING LURE

[76] Inventor: Richard A. Arms, P.O. Box 278, Sierra City, Calif. 96125

[21] Appl. No.: 24,220

[22] Filed: Mar. 26, 1979

Related U.S. Application Data

[63] Continuation of Ser. No. 838,009, Sep. 29, 1977, abandoned.

[51] Int. Cl.³ .............................................. A01K 85/00
[52] U.S. Cl. .................................................. 43/42.19
[58] Field of Search ................. 43/42.12, 42.19, 42.35, 43/42.36

[56] References Cited

U.S. PATENT DOCUMENTS

| | | | |
|---|---|---|---|
| 849,743 | 4/1907 | Martin | 43/42.19 X |
| 1,993,868 | 3/1935 | Thornberg | 43/42.12 |
| 2,597,982 | 5/1952 | Fitzgerald | 43/42.35 X |
| 2,653,408 | 9/1953 | Bradley | 43/42.12 |
| 3,245,171 | 4/1966 | Henry | 43/42.35 X |
| 3,439,443 | 4/1969 | Weimer | 43/42.12 |
| 4,016,671 | 4/1977 | Larsen | 43/42.19 X |
| 4,099,343 | 7/1978 | Enz | 43/42.19 |

*Primary Examiner*—James G. Smith
*Attorney, Agent, or Firm*—Flehr, Hohbach, Test

[57] ABSTRACT

A fishing lure of the spinner type including a shaft defining an axis of rotation and a spinning element formed of elongated pliable material mounted on the shaft for rotation about said axis.

4 Claims, 6 Drawing Figures

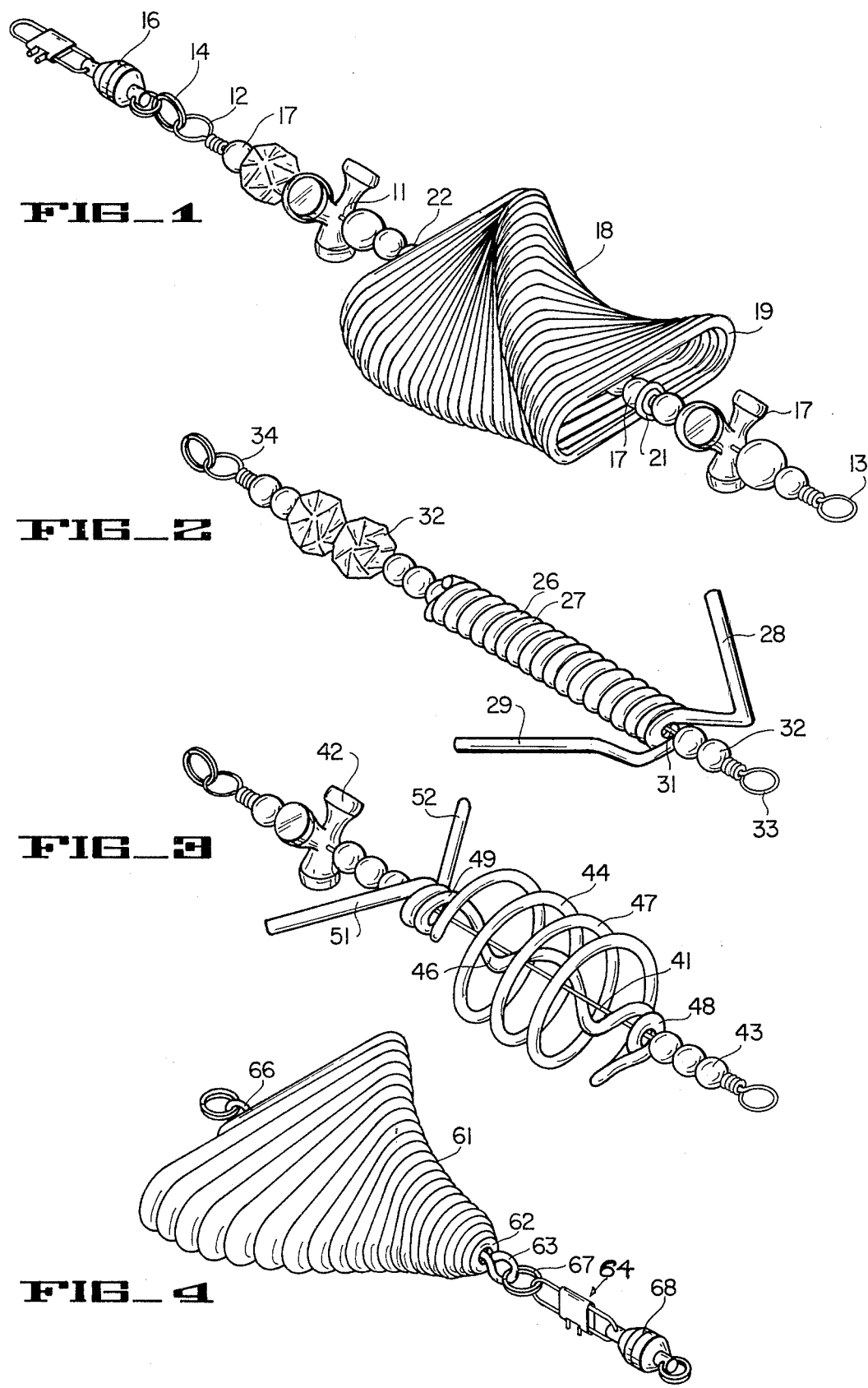

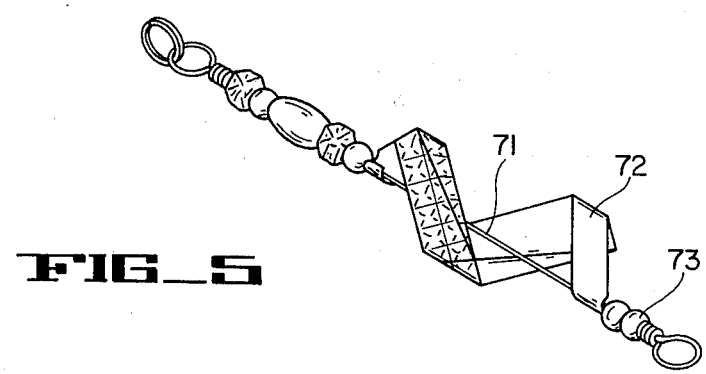
FIG_5
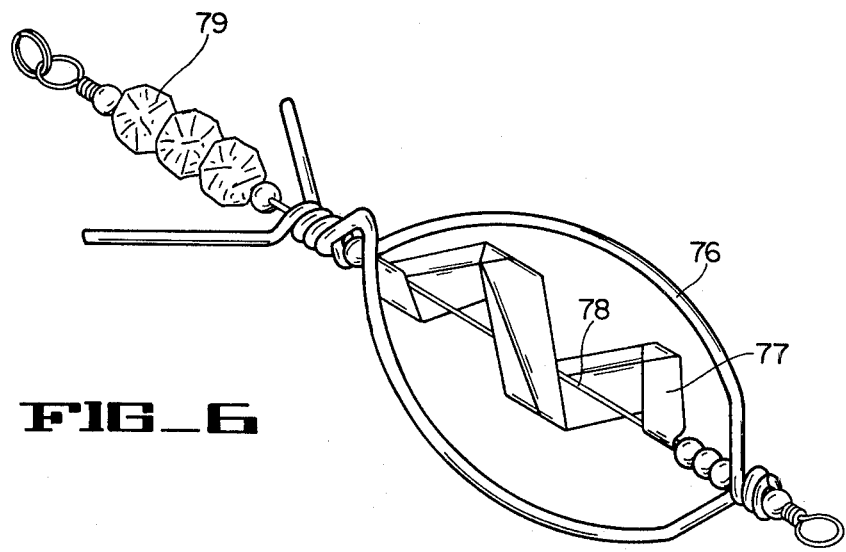
FIG_6

FISHING LURE

This is a continuation, of application Ser. No. 838,009 filed Sept. 29, 1977, now abandoned.

BACKGROUND OF THE INVENTION

This invention relates generally to fishing lures and more particularly to spinning lures for casting and trolling.

The general class of lures to which the present invention applies are spoons and spinners. Spoons comprise a spoon shaped member having an end attached to the fishing line and the other end attached to the hook. As the lure is drawn through the water it wobbles and entices the fish to strike. Spinners are spoons having one end hung on a shaft so that they hang on the shaft and can revolve about the shaft as the lure is drawn through the water. In contrast to the wobbling action of the spoon, the spinner has a spinning action. Spinners may include combinations of two or more blades mounted to revolve about a shaft. The blades in both the spinners and spoons have different shapes and configurations to achieve different effects. However, the blades in all such spinners and spoons are comprised of sheet material which is bent or formed to give different effects.

OBJECTS AND SUMMARY OF THE INVENTION

It is a general object of the present invention to provide an improved spinning lure.

It is another object of the present invention to provide a spinning lure which includes an axially mounted spinning element formed of elongated pliable material.

It is another object of the present invention to provide a spinning lure in which the spinner is formed from a plurality of convolutions of elongated pliable material.

It is another object of the present invention to provide a spinning lure in which the spinner is formed of elongated pliable material wound on a supporting shaft.

The foregoing and other objects of the invention are achieved by a spinning lure which includes a spinning member formed of elongated pliable material bent into predetermined shape and means for rotatably axially mounting said spinning member whereby when the lure is drawn through the water the spinning member rotates about its axis to attract and entice fish.

BRIEF DESCRIPTION OF THE DRAWINGS

FIG. 1 is a perspective view of a fishing lure in accordance with one embodiment of the present invention.

FIG. 2 is a perspective view of a fishing lure in accordance with another embodiment of the present invention.

FIG. 3 shows a fishing lure in accordance with a further embodiment invention.

FIG. 4 shows a lure similar to that of FIG. 1 but including a tapered member rotating.

FIG. 5 shows a fishing lure in accordance with the invention employing a ribbon material for the spinner.

FIG. 6 shows a fishing lure in accordance with the invention employing a ribbon and a wirelike material for the spinner.

DESCRIPTION OF PREFERRED EMBODIMENTS

Referring particularly to FIG. 1, the fishing lure includes a central support wire or shaft 11 which supports the spinner, element and defines the axis of rotation. The wire is bent at its two ends to form loops 12 and 13 for attachment to a line, to hooks to snap swivels or to split rings. As shown, the loop 12 is engaged by a split ring 14 which receives a swivel 16. The shaft 11 supports a plurality of beads 17 of various configurations. In addition, the shaft supports a spinning element 18 which, in accordance with the present invention, comprises a plurality of adjacent convolutions 19 formed from a pliant elongated material such as wire bent to form flat turns with the end of the first convolution bent in a loop 21 to encircle the wire shaft 11. The other end of the spinning element 18 is similarly bent to form loop 22 to engage the wire shaft at the other end. Thus the spinner 18 is supported on the shaft for rotation about its axis. As the spinner is drawn through the water it will rotate in a direction dependent upon the curvature of the spinner. In the embodiment illustrated, when the lure is drawn through the water with the line attached to the loop 13, the lure will spin in a counterclockwise direction.

The spinning member may be formed by taking a wire and winding it on a mandrel after which the spinning member is bent to a desired configuration. Furthermore, the spinning member 18 may be bent when fishing to provide more curvature for faster spinning or bent to provide less curvature for slower spinning. If desired, the spinning member 18 may be painted, anodized, dipped in plastic or the like to provide a smooth attractive surface. Fluorescent paint may be used to provide a fluorescent surface. It is seen that the member can be easily formed and that the spinner 18 is mounted on its axis for rotation. It will also be apparent that various types of beads 17 may be employed to give different aesthetic effects to the lure. In the example shown, certain of the beads extend into the lure.

The lure may be formed with the spinning member, such as shown in FIG. 2, wherein there is provided adjacent turns 26 and 27 which terminate in ears 28 and 29 respectively. The bent wire with its adjacent convolution is mounted upon the elongated axial shaft 31, together with the beads 32 of various types. The central wire is formed with loops 33 and 34 for connection to associated equipment. As the lure is drawn through the water in the direction of loop 33, the ears 28 and 29 cause the lure to spin. Again the ears may be bent in various shapes to effect different degrees of spinning.

It will, of course, be apparent that even though wire members which are circular in section are shown that the wire may take on many configurations such as square, rectangular, or flat. The essential element of the present invention being that the spinning element is formed of an elongated pliant material which can be formed by winding. As will presently be described, the elongated material may be ribbon material.

Referring to FIG. 3, another type of spinner is shown which again includes a central axial support shaft 41 supporting spaced beads 42 and 43 and a bent wire spinning element 44 which includes outer convolutions 47 of another diameter terminating in two ends to form loops 48 and 49 for supporting the spinner on the wire shaft 41. The wound wire includes ears 51 and 52 which impart a rotating motion to the lure. Thus, as the lure is rotated, it will have the optical effect of moving in two directions depending upon the sense of the windings 46 and 47.

The lure shown in FIG. 4 is similar to that shown in FIG. 1 but includes a tapered rotating element 61 mounted on shaft 62. The shaft includes loops 63 adapted to be attached to a snap swivel 64 and a second loop 66 shown attached to split ring 67 and swivel 68.

The lure shown in FIG. 5 includes a wire shaft 71 on which there is rotatably mounted a spinner 72 made of bent ribbon material which is shaped so that it causes the spinner to rotate. The lure includes a plurality of beads 73.

The lure shown in FIG. 6 includes independent spinners 76 and 77 mounted on the shaft 78. The spinner 76 is made of bent wirelike material, while the spinner 77 is made of ribbon material. The lure includes beads 79.

It is to be observed that lures of many configurations and shapes can be formed by using the rotating elements formed from bent elongated pliant material. The elements are mounted on a central axial shaft about which they rotate. The spinning elements can be bent to provide different degrees of rotation. The spinning elements can be formed of different sizes and configurations and may be wound clockwise or counterclockwise. The spinner material can be selected to give different effects.

What is claimed is:

1. A fishing lure comprising a shaft defining an axis of rotation and at least one spinning body member with a plurality of turns of elongated pliant material coiled symmetrically about said shaft, said turns being adjacent to one another to turn a substantially solid spinning element with the ends of said coil engaging said shaft at spaced locations to occupy a predetermined portion of said shaft so that the spinning member may rotate on said shaft, said at least one spinning member being the only member carried by said shaft portion.

2. A fishing lure comprising a shaft defining an axis of rotation and at least one spinning body member with a plurality of turns of elongated pliant material coiled symmetrically about said shaft, said turns being closely spaced and elongated with the ends of said coil engaging said shaft at spaced locations to occupy a predetermined portion of said shaft so that the spinning member may rotate on said shaft, said at least one spinning member being the only member carried by said shaft portion.

3. A fishing lure comprising a shaft defining an axis of rotation and at least one spinning body member with a plurality of spaced turns of elongated pliant material coiled symmetrically about said shaft, said turns including an outer winding and an inner winding with the ends of said coil engaging said shaft at spaced locations to occupy a predetermined portion of said shaft so that the spinning member may rotate on said shaft, said at least one spinning member being the only member carried by said shaft portion.

4. A fishing lure comprising a shaft defining an axis of rotation and at least one spinning body member with a plurality of turns of elongated pliant ribbonlike material coiled symmetrically about said shaft with the ends of said coil engaging said shaft at spaced locations to occupy a predetermined portion of said shaft so that the spinning member may rotate on said shaft, said at least one spinning member being the only member carried by said shaft portion.

* * * * *